United States Patent [19]
Lefumeux

[11] Patent Number: 5,596,232
[45] Date of Patent: Jan. 21, 1997

[54] CONTINUOUS PROCESS FOR THE SOLVENTLESS MANUFACTURE OF COMPOSITE PYROTECHNIC PRODUCTS

[75] Inventor: Alain Lefumeux, Orsay, France

[73] Assignee: Societe Nationale des Poudres et Explosifs, Paris, France

[21] Appl. No.: 508,701

[22] Filed: Jul. 28, 1995

[30] Foreign Application Priority Data

Jul. 29, 1994 [FR] France .................. 94 09407

[51] Int. Cl.$^6$ .................................................. C06B 21/00
[52] U.S. Cl. ........................................ 264/3.2; 149/19.92
[58] Field of Search .................. 264/3.1, 3.2; 149/19.92, 149/19.93; 422/159, 163

[56] References Cited

U.S. PATENT DOCUMENTS

| | | | |
|---|---|---|---|
| 2,874,604 | 2/1959 | Diels et al. | 86/1.1 |
| 2,939,176 | 6/1960 | Adelman | 264/3.1 |
| 2,973,549 | 3/1961 | Hurst . | |
| 3,227,588 | 1/1966 | Jones et al. . | |
| 4,090,894 | 5/1978 | Reed et al. | 149/19.91 |
| 4,605,309 | 8/1986 | Albers . | |
| 4,657,607 | 4/1987 | Perotto et al. . | |
| 4,773,762 | 9/1988 | Albers . | |
| 4,963,296 | 10/1990 | Niedermeier et al. . | |
| 5,035,843 | 7/1991 | Schmid | 264/3.2 |
| 5,266,242 | 11/1993 | Mogendorf et al. . | |
| 5,483,862 | 1/1996 | Hale | 86/21 |

FOREIGN PATENT DOCUMENTS

| | | |
|---|---|---|
| 406190 | 1/1991 | European Pat. Off. . |
| 324800 | 7/1991 | European Pat. Off. . |
| 3013490 | 10/1981 | Germany . |
| 3704108 | 8/1988 | Germany . |
| 9405607 | 3/1994 | WIPO . |

*Primary Examiner*—Charles T. Jordan
*Assistant Examiner*—John R. Hardee
*Attorney, Agent, or Firm*—Cushman Darby & Cushman IP Group Pillsbury Madison & Sutro LLP

[57] ABSTRACT

Continuous process for the manufacture of thermoformable composite pyrotechnic products comprising at least one thermoplastic or quasi-thermoplastic binder and an organic or inorganic crystalline oxidizing charge, which are mixed and homogenized on a roll mill consisting of two cylindrical rollers of identical length, with parallel axes situated in the same horizontal plane, the rollers turning in opposite directions to each other with different speeds of rotation and their axes being separated from each other so as to allow a minimum separation to exist between the external surfaces of the two rollers in the plane containing the two axes. The binder is introduced continuously into a feed zone situated at one of the ends of the said rollers, in a pre-formulated solid form containing all the constituents of the binder and being free from solvent so that the binder forms a continuous sheet which covers the faster turning roller. The product is withdrawn continuously into a recovery zone situated at the end of the rollers opposite to that where introduction of the binder takes place, the said oxidizing charge is introduced continuously in the form of crystals in a zone situated between the binder feed zone and the recovery zone of the pyrotechnic product and arranged above the roller covered with the binder, the size of the crystals constituting the oxidizing charge being at most equal to the minimum separation existing between the external surfaces of the two rollers. Apparatus for carrying out the process is also disclosed.

19 Claims, 3 Drawing Sheets

FIG_1

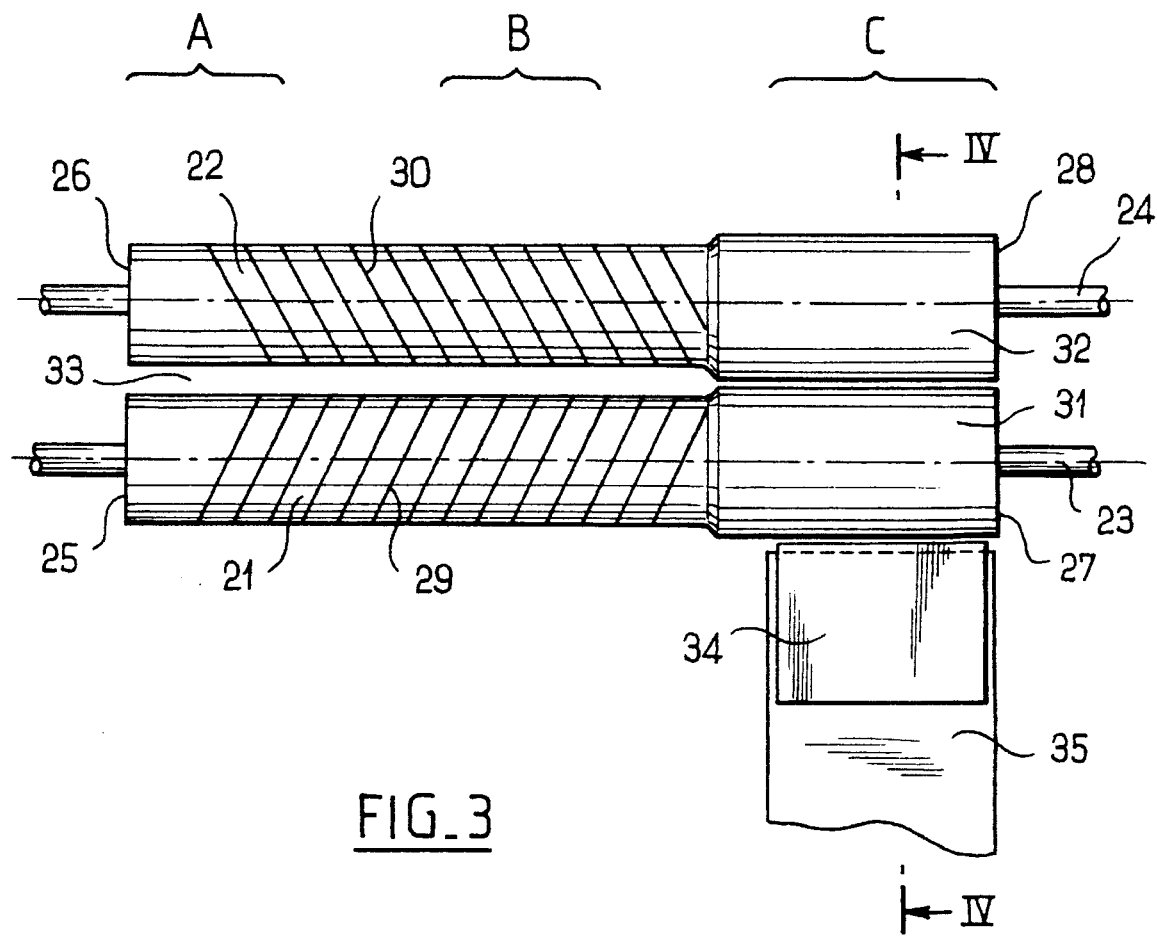
FIG_3
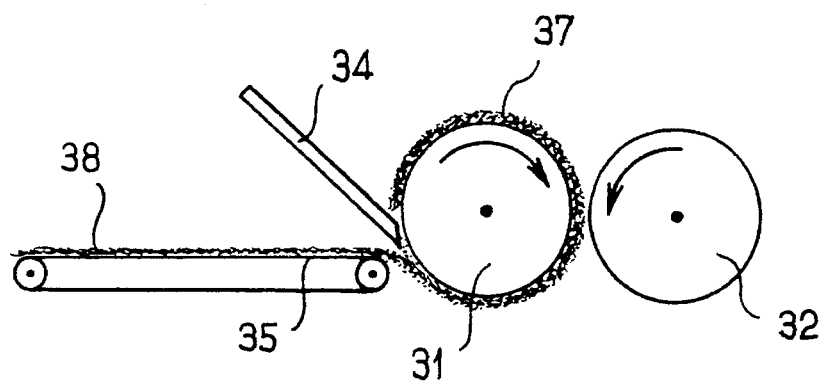
FIG_4

CONTINUOUS PROCESS FOR THE SOLVENTLESS MANUFACTURE OF COMPOSITE PYROTECHNIC PRODUCTS

The present invention relates to the field of the manufacture of composite pyrotechnic products consisting in particular of a polymerized organic binder and an organic or inorganic energy charge. More precisely the invention concerns a continuous process for the solventless manufacture of thermoformable composite pyrotechnic products which can, after having been put into the appropriate form, constitute propellant powders for weapons, solid propellants for rocket motors, explosive charges, pyrotechnic compositions for gas generators and for special effects, (decoys, smoke generating substances, etc.).

For the solventless manufacture of composite pyrotechnic products, as for the manufacture of traditional pyrotechnic products based on nitrocellulose and possibly nitroglycerine, discontinuous or semi-continuous processes are known in which the mixture consisting of the binder and charge undergo several mixing operations in the course of which polymerization of the said binder may develop. These mixing operations may be carried out in conventional mixers or in screw extruders. Such processes are, for example, described in American patent U.S. Pat. No. 4,657,607 or in French patent 2,692,257. These processes however have the disadvantage of being relatively complex.

For the manufacture of powders based on nitrocellulose and nitroglycerine, a well known three stage process has been proposed for example by American patents U.S. Pat. No. 4,963,296 and U.S. Pat. No. 5,266,242 according to which in an initial stage a moist mixture of nitrocellulose and nitroglycerine is gelatinized continuously on and between the rollers of a roll mill-granulator formerly used for processing plastics, the gelatinized mixture thus obtained is transformed into pellets in a second stage and the pellets thus obtained are put into an extruder in a third stage to be extruded and shaped.

Like all processes using roll mills, this process satisfactorily prevents risks of explosion in the first stage in case of accidental ignition but is limited to powders based on nitrocellulose and nitroglycerine. In addition, when according to this process a person skilled in the art wishes to manufacture powders containing a third crystalline energy base such as hexogen, octogen or nitroguanidine, he is expressly taught by the abovementioned patents that incorporation of this third base should not be carried out on the roll mill, but should be carried out during the third stage, that is to say in the extruder with all the disadvantages due to confinement presented by this type of equipment.

It has also been proposed, for example in European Patent EP-A-0 406 190 or in PCT patent application WO 94/05607 to manufacture, on such a roll mill-granulator, composite pyrotechnic products consisting of a binder and oxidizing crystalline charges. However, doubtless by reason of the danger presented by the oxidizing charges, incorporation of these charges in the binder is carried out in the presence of solvents or liquid binders and more often charge desensitizers which leads to complex installations such as that indicated in application EP-A-0 406 190.

These installations have many points along the rollers of the roll mill at which different components of the pyrotechnic composition are introduced, constituents in the liquid state being introduced by spraying, which does not make the process complicated. Furthermore, according to the teaching of the two abovementioned applications, introduction of the crystalline oxidizing charge is preferably carried out at the beginning of the equipment on rollers not covered with binder. In order to reduce the risks of ignition, the oxidizing charge is treated with a moderating agent which is not without consequences for the cost of the final product. Finally, by reason of the use of binders in the liquid state, the product obtained on the roll mill has to be subsequently retreated and the processes described in these two applications are mainly directed towards obtaining pasty products or products in the form of pellets. Now, for certain industrial applications, as for example metal work, a person skilled in the art needs solid products in strip form. The processes described in these two applications do not allow such products to be obtained directly. Within the meaning of the present application a solid product is understood to mean a product that has mechanical properties not excluding a certain flexibility similar to rubbers.

A person skilled in the art thus does not at the present time have available a continuous, simple solventless process, enabling him to incorporate a crystalline energy base in a binder with a view to obtaining a composite solid pyrotechnic product without risk of explosion in the event of accidental ignition.

The object of the present invention is precisely to propose such a process.

The invention thus concerns a continuous process for the manufacture of thermoformable composite pyrotechnic products comprising at least one thermoplastic or quasi-thermoplastic binder and an organic or inorganic crystalline oxidizing charge, which are mixed and homogenized on a roll mill consisting of two cylindrical rollers of identical length, with parallel axes situated in the same horizontal plane, the said rollers turning in opposite directions to each other with different speeds of rotation, their axes being separated from each other so as to allow a minimum separation to exist between the external surfaces of the two rollers in the plane containing the two axes, the said process being characterized in that:

i) the said binder is introduced continuously into a feed zone situated at one of the ends of the said rollers, in a pre-formulated solid form containing all the constituents of the binder and being free from solvent, the said binder thus forming a continuous sheet which covers the faster turning roller, ii) the said pyrotechnic product is withdrawn continuously into a recovery zone situated at the end of the rollers opposite to that where introduction of the binder takes place, iii) the said oxidizing charge is introduced continuously in the form of crystals in a zone situated between the binder feed zone and the recovery zone of the pyrotechnic product and arranged above the roller covered with the binder, iv) the size of the crystals constituting the oxidizing charge being at most equal to the minimum separation existing between the external surfaces of the two rollers.

The term "quasi-thermoplastic compounds" as used herein is intended to represent compounds which have a thermoplastic behavior but which are capable, on addition of external energy such as heat or electron bombardment, of reacting between themselves to form an indeformable crosslinked polymer, the term "quasi-thermoplastic" as used is thus synonymous with "quasi-thermosetting".

The binder is preferably introduced in the form of solid pellets but it may also be introduced in other solid forms, for example in the form of a strip. The plasticity of the binder then enables it to be transformed in a few turns into a sheet adhering to the faster turning roller.

According to a first preferred variant of the invention the zone in which the oxidizing charge is introduced is situated essentially half way along the two rollers.

According to a second preferred variant of the invention the temperature of the rollers can be regulated and can vary along each roller. This temperature will in general be between 20° C. and 120° C. and will be more often between 20° C. and 100° C.

The external surface of each roller can be non-machined but according to a third preferred variant of the invention, the external surface of each roller is machined and has a hollow helical groove.

In this case, according to a particular method of carrying out the invention, the external surface of each roller remains smooth in the recovery area and is not grooved there. Advantageously this smooth part of each roller in the recovery zone has an increased external roller diameter, the external surfaces of the two rollers remaining however separated, allowing a minimum gap to exist between the rollers in the plane containing the two axes, this minimum gap being however less than that existing between the grooved surfaces of the rollers. This arrangement enables the pyrotechnic product to be withdrawn continuously in the form of a calendered strip.

The oxidizing crystalline charge may be an inorganic charge selected from the group consisting of ammonium perchlorate, potassium perchlorate, ammonium nitrate, sodium nitrate, or furthermore an organic charge selected from the group consisting of hexogen, octogen, oxynitrotriazole and nitroguanidine.

The pre-formulated binder pellets may consist of a thermoplastic resin, the softening temperature of which is between 100° C. and 200° C. or of a mixture of such a resin with a plasticizer of the latter, the weight of plasticizer being between 10 and 70% by weight of the said resin. In this latter case, the softening temperature of the thermoplastic resin/plasticizer mixture is generally between 100° C. and 150° C.

However the preformulated binder pellets can also consist of thermoplastic compounds capable of reacting between themselves to form a crosslinked polymer, as a result of external application of energy.

Such compounds that are described in the present application as "quasi-thermoplastic" enable the process according to the invention to be put into practice with a binder having thermoplastic properties enabling, for example, the pyrotechnic product to be put into an appropriate form by extrusion or furthermore recycled during manufacture, but also, when the desired product has been obtained in the required form, enabling the latter to be set by crosslinking using, in particular, electron bombardment or curing in an oven.

Such quasi-thermoplastic compounds may consist of polymers having vinyl or acrylic functional groups or of mixtures of at least:

i) a polyol, ii) a reactive polyisocyanate, iii) a blocked polyisocyanate, the molar ratio of reactive NCO/OH being between 0.4 and 0.6 and the molar ratio of blocked NCO/OH being between 0.6 and The invention also concerns an apparatus for a particular method or of putting the invention into practice comprising:

i) a roll mill consisting of two identical cylindrical rollers, the axes of which are situated in the same horizontal plane, turning in opposite directions to each other at different speeds, and having smooth end zones with a larger diameter and arranged opposite each other, the external surfaces of these two zones remaining separated so as allow a slit to exist between them, ii) a knife pressing on the external surface of the end zone of the faster turning roller, iii) a conveyer belt arranged opposite the end zone of the faster turning roller and perpendicular to the axis of the latter.

The process according to the invention also provides a person skilled in the art with a continuous manufacturing process for composite pyrotechnic products with a thermoplastic or quasi-thermoplastic binder containing a crystalline oxidizing charge. This process is very safe since it operates without confinement and hence does not present any risks of explosion. It is very simple and very reproducible since it only uses solid products, easy to meter continuously and introduced mainly in two zones of the roll mill. Contrary to any teaching of the prior art it enables untreated crystalline oxidising charges to be used directly on the roll mill and thus, by this type of apparatus, provides a person skilled in the art with very high performance compositions which could, until now, only be obtained by conventional processes having an explosion risk.

Products obtained by the process according to the invention are preferably applied in the field of propellant powders for weapons, propellant powders for rocket motors, explosives for industrial and military use, and pyrotechnic compositions for generating gases or for special effects.

A detailed description will now be given of the invention referring to FIGS. 1 to 4.

BRIEF DESCRIPTION OF THE DRAWINGS

FIG. 3 is a diagrammatic view representing the rollers, the knife and the conveyor belt of the roll mill represented in FIG. 2.

FIG. 4 is a diagrammatic cross section through IV—IV of the roll mill represented in FIG. 3.

FIG. 1 represents an installation enabling the process according to the invention to be put into practice. This installation comprises a roll mill consisting of two cylindrical rollers 1 and 2 carried by two supporting blocks 3 and 4, one of the two blocks containing motors driving the two rollers. The two rollers 1 and 2 have an identical length and have their axes parallel and situated in the same horizontal plane. The axes of the two rollers are separated from each other so as to allow a minimum separation to exist between the external surfaces of the two rollers in the plane containing the two axes. The said external surfaces thus do not touch and do not rub against each other but on the contrary allow a slit to exist between the two rollers. The said rollers turn in opposite directions to each other with different speeds of rotation, roller 1 turning faster than roller 2.

Figure 1:
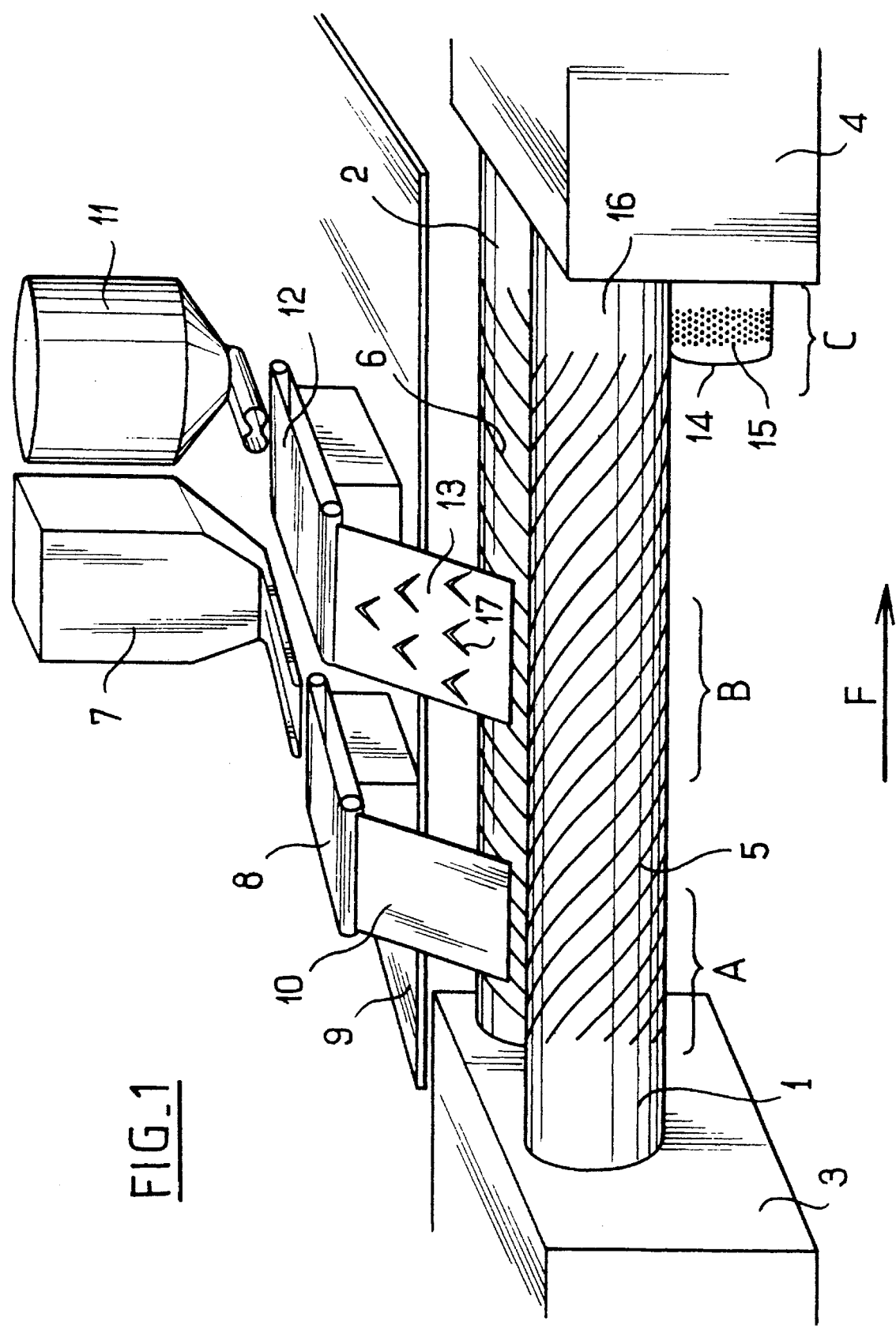
FIG. 1 represents a perspective view of an installation enabling the process according to the invention to be put into practice.

Within the context of the present invention the external surface of each roller need not be machined. However, preferably and as represented in FIG. 1, the external surface of each roller will be machined so as to have at least one hollow helical groove 5 or 6. These grooves preferably have sharp edges and are positioned so as to apparently form an angle between them. Such a roll mill is for example described in detail in American patent 4,605,309 for the manufacture of objects made of plastics, for example of PVC. As is explained in the latter patent the thermoplastic material introduced at one end of the roll mill advances towards the other end forming a continuous sheet on the faster turning roller and being subjected to very strong shearing action in the slit existing between the rollers.

The temperature of each roller 1 or 2 can be regulated independently of that of the other roller and may vary along the roller. In general the operating temperature as earlier stated will be between 20° C. and 120° C.

Within the context of the present invention it is possible to use roll mills with different dimensions. The applicant indicates that he has obtained very satisfactory results with a roll mill having the following characteristics:

diameter of rollers: 200 mm, useful length of rollers: 1400 mm, minimum separation of between 0.7 and 2.5 mm, grooves on the rollers: depths: 1.5 mm, width: 5 mm, slope: 30° speed of rotation of between 20 and 45 revolutions per minute.

According to the invention, the binder is introduced continuously, preferably in the form of solid pellets, in a feed zone A situated at one of the ends of the said rollers.

The feed device comprises a metering hopper 7 which sprinkles the binder pellets over a conveyor belt 8 supported by a rack 9 arranged above the rollers 1 and 2. A vibrating feed chute 10 enables the binder pellets to be sprinkled in a rain on the faster turning roller 1. The binder thus very rapidly forms a continuous sheet which covers roller 1 and which moves towards the opposite end of roller 1 in the direction of the arrow F shown in FIG. 1.

According to an essential characteristic of the invention the solid binder granules are pre-formulated. They contain all the constituents of the binder and are free from solvent. Preferably they also contain various additives necessary to produce the intended pyrotechnic product with the exclusion of crystalline oxidizing charges. They may thus contain for example combustion catalysts, stabilisers or reducing charges such as metallic charges.

The crystalline oxidizing charge is introduced continuously in the form of pellets or preferably crystals in a zone B situated between the binder feed zone A and the recovery zone C of the pyrotechnic product which is situated at the end of roller 1 opposite the feed zone A.

According to another essential characteristic of the invention it is essential to position zone B above roller 1 so as that the oxidizing crystalline charge encounters the binder sheet in a zone where there is no shear. It is compliance with this condition which enables non treated crystalline oxidizing charges to be used and which thus enables very high performance compositions to be obtained. Moreover, still for reasons of safety, it is essential that the size of the crystals constituting the oxidizing charge be at most equal to the minimum separation existing between the external surfaces of the two rollers so that there is no grinding action on the oxidizing charge on the roll mill.

Advantageously, the zone B in which the oxidizing crystalline charge is introduced is situated essentially half way along the two rollers as represented in FIG. 1 where a metering hopper 11 may be observed which sprinkles the oxidizing charge onto a conveyor belt 12 carried by the rack 9. A vibrating feed chute 13 enables the oxidizing charge to be sprinkled in a fine rain on roller 1. In order to ensure good distribution of the oxidizing charge in a fine rain, the chute 13 will be advantageously provided with baffles 17.

All the installation is of course carefully connected to earth to avoid any accumulation of static electricity.

The oxidizing charge is thus intimately mixed with binder due to the shearing action of the binder/charge mixture exerted in the slit existing between the rollers, this shearing action however involving no grinding action of the charge contrary to the teaching of PCT application WO 94/05607 already referred to. It may also be noted that in the process according to the invention, due to the fact that the oxidizing charge is introduced onto the continuous sheet of binder, there is no loss of charge pellets between the rollers of the roll mill, also contrary to the teaching of this same application. This amounts to a very considerable advantage, as regards safety and the reproducibility of products, afforded by the process according to the invention. Of course in order fully to ensure this advantage the precise composition of the binder is adapted to the amount of oxidizing charge that it must accept.

The pyrotechnic product consisting of the binder, possible additives and oxidizing charge is withdrawn continuously in the recovery zone C situated at the end of roller 1 opposite to that where the introduction of the binder takes place.

If it is desired to recover the pyrotechnic product in the form of pellets, a granulator 14, as represented in FIG. 1, may be used, consisting of a hollow cylinder the external surface of which has a perforated grid 15 applied against the end 16 of roller 1 corresponding to the recovery zone C. The granulator 14 is applied against roller 1 and turns in the opposite direction to roller 1 and the sheet of pyrotechnic product situated on part 16 of roller 1 is cut into pellets which are recovered inside the granulator. Advantageously the end 16 of roller 1 is smooth as represented in FIG. 1. For a roll mill having the dimensions previously indicated, the length of this zone 16 will advantageously be of the order of 10 cm.

Figure 2:
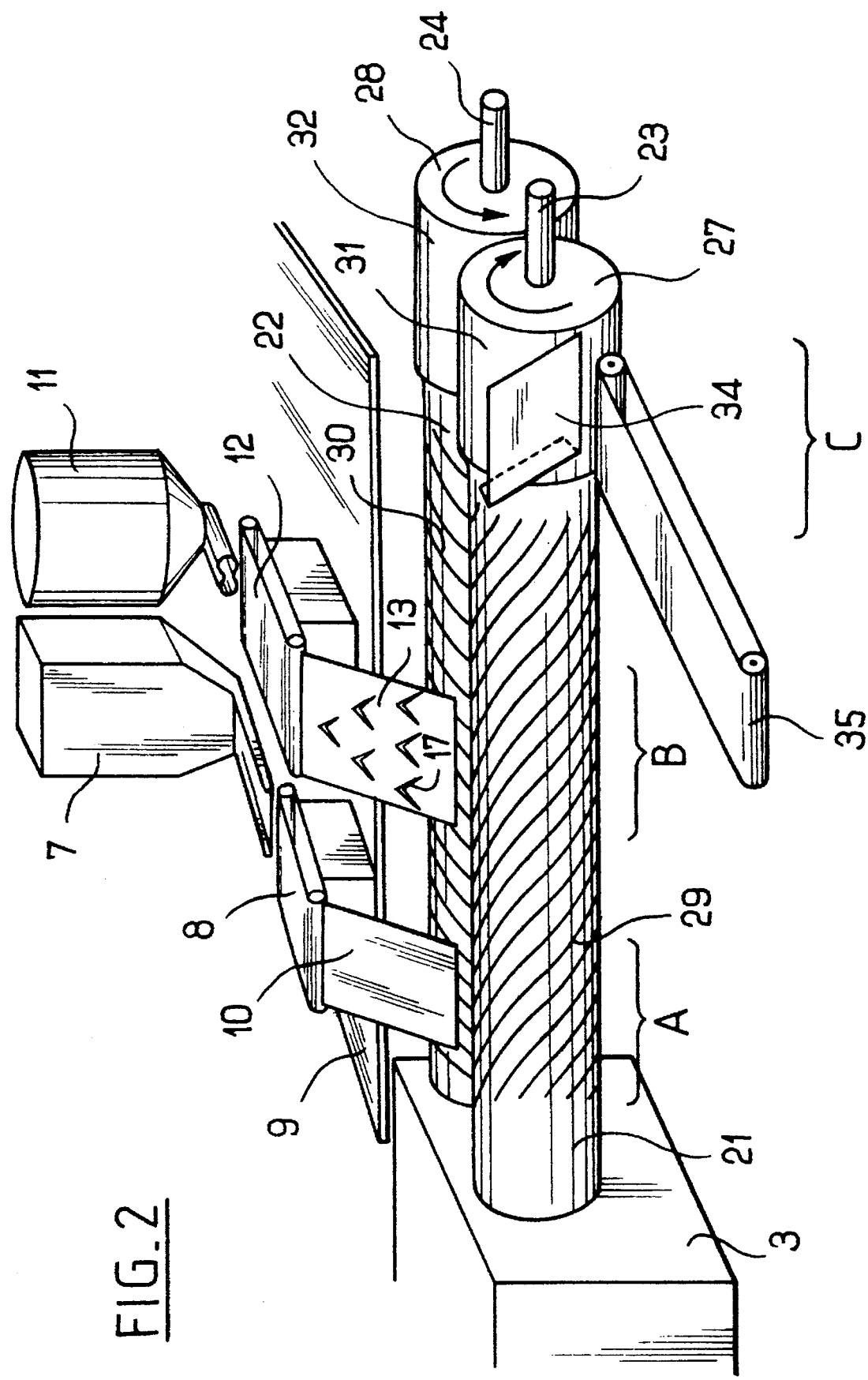
FIG. 2 represents a perspective view of an installation comprising a roll mill enabling calendered strips to be obtained according to a particular method of carrying out the invention.

However, according to a particular method of carrying out the invention, it is also possible to withdraw the pyrotechnic product in the form of a strip and in particular a calendered strip as represented in FIGS. 2, 3 and 4.

A roll mill has been represented in these figures consisting of identical cylindrical rollers 21 and 22 with their drive shafts 23 and 24 situated in the same horizontal plane. For reasons of clarity in the drawing, only one support block 3 has been represented.

Rollers 21 and 22 have hollow helical grooves 29 and 30 which, characteristically, do not extend over the entire length of the rollers but commence from the ends 25 and 26 of the rollers situated on the left hand part of FIG. 3 to end before the opposite ends 27 and 28 situated on the right hand part of FIG. 3. Rollers 21 and 22 thus each have a smooth end zone 31 or 32. These end zones 31 or 32 have the same width and are arranged opposite each other. When the process is put into action these correspond to the recovery zone C.

The binder and oxidizing charge feed devices are similar to those described for FIG. 1 and have been represented on FIG. 2 by the same references as for FIG. 1.

Preferentially the end zones 31 or 32 have an identical increase in their external diameter as represented in FIGS. 2 and 3, their external surfaces remaining separated in the horizontal plane containing the axes of the two rollers 21 and 22. Seen from above a continuous slit 33 thus exists between the rollers 21 and 22, this slit having a greater separation between the grooved parts of the two rollers than between the smooth zones 31 and 32. A knife 34, the supporting device for which has not been represented for the sake of clarity, is applied against roller 21 which turns faster on the smooth zone 31. Preferentially, this knife 34 is applied in a continuous manner against roller 21. As represented in FIG. 2 this knife consists of a square having two sharp edges, one of the two edges being arranged parallel to the generating lines of roller 21, the other edge being arranged perpendicular to the latter.

A conveyer belt 35 is arranged opposite the smooth zone 31 of roller 21, perpendicular to the axis of the latter. In operation zone A in which the binder and possible additives are introduced is situated at the grooved ends 25 and 26 of rollers 21 and 22, the zone B in which the oxidizing charge is introduced is situated above the roller 21 mid-way along the latter and the recovery zone C corresponds, as already indicated, to the smooth zones 31 and 32.

These smooth zones 31 and 32 have a width at least equal to one fifth of the total length of the rollers 21 and 22.

The direction of rotation of cylinder 21 is selected such that, after contact with the knife 34, the external surface of the smooth zone 31 moves towards the slit 33, as represented in FIG. 3.

The continuous sheet of pyrotechnic product 37 is thus sliced continuously, calendered between the smooth zones 31 and 32 and withdrawn in the form of the calendered strip 38 on the conveyer belt 35. It should be noted that the sharp edge of the knife 34 perpendicular to the generating lines of roller 21 operates permanently as a slicing tool, while the sharp edge of the knife 34 parallel to the generating lines of roller 21 only serves to initiate detachment of the strip 38 at the start.

This method of operation is particularly advantageous when it is desired to obtain calendered strips of explosive or propellant powders.

The oxidizing crystalline charge may be an inorganic charge as for example ammonium perchlorate, potassium perchlorate, ammonium nitrate or sodium nitrate.

It may also be an organic charge such as hexogen, octogen, oxynitrotriazole or nitroguanidine.

In any case, the mesh size into which it is cut should be carefully defined so as to be sure that the minimum separation between the rollers of the roll mill are at least equal to the size of the crystals of the constituent.

Pre-formulated solid binder pellets may consist of a true thermoplastic resin the softening temperature of which is between 100° C. and 200° C.

This resin may be for example a homopolymeric resin selected from the group consisting of polyethylenes, polypropylenes, polybutylenes, polyisobutylenes, cellulose esters, vinyl polyacetates, vinyl polyalcohols, polyamides such as polyamides 11 or polyamides 12.

This resin may also be a sequenced copolymer or a block copolymer as for example polyvinyl polyacetates, polyvinyl polyalcohols, polyvinyl polybutyrals, styrene/butadiene/styrene block copolymers, styrene/isoprene/styrene block copolymers, styrene/ethylene-butylene/styrene block copolymers, polyether/polyamide block copolymers, block polyurethanes with polyether, polyester and polyacetal units and vinylidene polyfluoride.

Besides the thermoplastic resin itself, the preformulated binder pellets may contain a plasticiser as for example dioctyl phthalate, dioctyl adipate, dioctyl azelate, butyl benzene sulfonamide and toluene sulfonamide.

The weight of plasticizer used will in general be between 10 and 70% of the weight of the said thermoplastic resin. Under these conditions the softening temperature of the thermoplastic resin/plasticizer mixture will in general be between 100° C. and 150° C.

However, as has been already indicated above, the preformulated solid binder pellets may also consist of quasi-thermoplastic compounds, that is to say of compounds which have a thermoplastic behaviour but which are capable, on addition of external energy such as heat or electron bombardment, of reacting between themselves to form an indeformable crosslinked polymer.

The said quasi-thermoplastic compounds may be linear polymers bearing functional vinyl or acrylic groups, such as for example acrylic polybutadienes, acrylic polyurethanes or acrylic polyesters.

The said quasi-thermoplastic compounds may also consist of a mixture of at least:

(i) one polyol (ii) one reactive polyisocyanate, that is to say a polyisocyanate the NCO groups of which can react immediately with the OH groups of the polyol, (iii) one blocked polyisocyanate the NCO groups of which are "masked" and cannot react with the OH groups of polyol while no external energy has been introduced.

The molar ratio of reactive NCO groups to OH groups of the polyol will in general be between 0.4 and 0.6 while the molar ratio of blocked NCO groups to OH groups of the polyol will in general be between 0.6 and 0.4.

As a polyol use may advantageously be made of hydroxytelechelic polybutadienes, polyether diols, polyester diols, polycarbonate diols, polyethylene glycols and polypropylene glycols.

As polyisocyanates use may advantageously be made of aromatic or aliphatic polyisocyanates such as toluene diisocyanate, diphenyl methane diisocyanate, hexamethylene diisocyanate and isophorone diisocyanate.

In order to block part of the isocyanate use may advantageously be made of isocyanate dimers or trimers or furthermore of blocking agents such as for example phenols, cresols, diethyl malonate or butanone oxime.

The blocked isocyanates are unblocked by introduction of heat possibly in the presence of a catalyst selected from the group consisting of organic tin salts or tertiary amine salts.

When the binder pellets consist of a true thermoplastic resin, possibly in the presence of a plasticizer, the rollers of the roll mills will preferably be heated so as to derive maximum benefit from the thermoplastic properties of the binder.

On the other hand when the binder pellets consist of quasi-thermoplastic compounds, the rollers of the roll mill will not be heated or will be heated only to a moderate extent so as not to cause crosslinking of the binder on the roll mill.

The following examples illustrate certain possibilities of putting the invention into practice without limiting its scope.

These examples were carried out on a roll mill having the general characteristics indicated above in the description and with an installation in accordance with that represented in FIG. 1.

EXAMPLE 1

Manufacture of a thermoplastic bonded composite explosive.

binder:

preformulated pellets in the form of cylindrical pellets having a diameter of 5 mm and a height of 5 mm and a composition:

thermoplastic polymer: 5.8 parts by weight plasticizer 4 parts by weight antioxidant 0.1 parts by weight binder-charge adhesion agent 0.1 parts by weight oxidizing charge:

fine hexogen crystals having a particle size range of 0–600 microns.

manufacturing conditions:

binder feed rate: 3.5 kg/hour charge feed rate: 31.5 kg/hour minimum separation between rollers: 0.7 mm roller 1: speed: 44 rpm temperature: 85° C.

roller 2: speed: 42 rpm temperature: 100° C.

Pellets were thus obtained in the form of 4 mm diameter discs at a temperature of 95° C., the composition of which was 10% by weight of binder and 90% by weight of oxidizing charge.

These pellets were compacted at 80° C. under 50 MPa (ie 500 bars) in the form of cylindrical objects which had a detonation rate of 8270 meters/second.

EXAMPLE 2

Manufacture of a thermoplastic bonded composite explosive.

binder:

preformulated pellets in the form of cylindrical pellets having a diameter of 4 mm and a height of 4 mm and having the composition:

thermoplastic polymer: 5.8 parts by weight plasticizer: 4.0 parts by weight antioxidant : 0.1 parts by weight binder-charge adhesion agent: 0.1 parts by weight aluminium powder: 20 parts by weight oxidizing charge:

fine hexogen crystals having a particle size of 0–600 microns.

The procedure was as described in example 1 with the following feed rates:

| binder granules containing aluminium | 9 kg/hour |
|---|---|
| oxidizing charge | 21 kg/hour |

Explosive pellets were obtained containing 10% by weight of binder (excluding aluminium), 20% by weight of aluminium and 70% by weight of charge. These pellets were compacted into the form of cylindrical objects which had a detonation rate of 7840 meters per second.

EXAMPLE 3

Manufacture of a flexible thermoplastic bonded composite explosive strip.

binder:

Preformulated pellets having the composition:

thermoplastic polymer 8.6 parts by weight plasticizers: 5.8 parts by weight antioxidant: 0.14 parts by weight adhesion agent: 0.06 parts by weight internal lubricant: 0.4 parts by weight oxidizing charge:

crude hexogen crystals having a particle size range of 0–800 microns.

The procedure was as described in example 1 with the following operating conditions:

roller one: speed: 37 rpm temperature: 85° C.

roller two: speed: 34 rpm temperature: 85° C.

minimum separation between the rollers: 1 mm binder feed rate: 3.3 kg/hour oxidizing charge feed rate: 18.7 kg/hour.

The composite product situated in the recovery zone C was cut up into strips 4 mm wide and 1 mm thick, the temperature of the strip being 87° C.

The explosive thus obtained containing 15% by weight of binder, 85% by weight of charge and had a detonation rate of 8000 metres per second.

EXAMPLE 4

Manufacture of a quasi-thermoplastic bonded composite explosive.

binder preformulated pellets having the composition:

polybutadiene with OH terminal groups: 17.7 parts by weight reactive isocyanate: 1.08 parts by weight blocked isocyanate: 0.72 parts by weight isocyanate deblocking catalyst system: 0.3 parts by weight oxidizing charge:

fine hexogen crystals with a particle size range of 0–600 microns.

The procedure was as described in example 1 with the following operating conditions:

roller 1: speed: 38 rpm temperature: 40° C.

roller 2: speed: 35 rpm temperature: 40° C.

separation between rollers: 0.7 mm binder feed rate: 3.4 kg/hour oxidizing charge feed rate: 19.1 kg/hour Explosive pellets were obtained which were compacted into the form of cylindrical objects.

The geometry of these objects was fixed by curing in an oven at 80° C. for 12 hours.

The explosive thus obtained had a detonation rate of 7850 metres per second.

EXAMPLE 5

Manufacture of a composite propellant with a quasi-thermoplastic binder for generating gases.

binder:

the binder was pre-formulated in the form of a continuous flexible strip which was used as such for feeding zone A of the roll mill. The composition of this strip was as follows:

polybutadiene with OH end groups: 17.4 parts by weight reactive isocyanate: 0.7 parts by weight blocked isocyanate: 0.9 parts by weight stabilizer: 0.2 parts by weight additive: 0.5 parts by weight catalyst: 0.3 parts by weight oxidizing charge:

sodium nitrate with a particle size of 60 microns: 40 parts by weight ammonium perchlorate with a particle size of 40 microns: 40 parts by weight Subject to changes to the binder feed referred to above, the procedure was as in example 1 with the following operating conditions:

roller 1: speed: 40 rpm temperature 20° C., roller 2: speed: 36 rpm temperature: 20° C.

minimum separation between rollers: 1.6 mm binder feed rate: 4.0 kg/hour oxidizing charge feed rate: 16.0 kg/hour Pellets of propellant were thus obtained which had a temperature of 28° C.

These pellets were extruded in the form of propellant strands the geometry of which was fixed by curing in an oven at 90° C. for 24 hours.

The propellant thus obtained had a combustion rate of 40 millimetres per second under a pressure of 7 MPa (ie 70 bars).

The invention claimed is:

1. Continuous process for the manufacture of thermoformable composite pyrotechnic products comprising at least one thermoplastic or quasi-thermoplastic binder and an organic or inorganic crystalline oxidizing charge, which are mixed and homogenized on a roll mill consisting of two cylindrical rollers (1, 2) of identical length, with parallel axes situated in the same horizontal plane, the said rollers turning in opposite directions to each other with different speeds of rotation, their axes being separated from each other so as to allow a minimum separation to exist between the external surfaces of the two rollers in the plane containing the two axes, the said process being characterized in that:

(i) the said binder is introduced continuously into a feed zone (A) situated at one of the ends of the said rollers in a pre-formulated solid form containing all the constituents of the binder and being free from solvent, the said binder thus forming a continuous sheet which covers the faster turning roller (1), (ii) the said pyrotechnic product is withdrawn continuously into a recovery zone (C) situated at the end of the rollers opposite to that where introduction of the binder takes place, (iii) the said oxidizing charge is introduced continuously in the form of crystals in a zone (B) situated between the binder feed zone (A) and the recovery zone (C) of the pyrotechnic product and arranged above the roller (1) covered with the binder, (iv) the size of the crystals constituting the oxidizing charge is at most equal to the minimum separation existing between the external surfaces of the two rollers.

2. Process according to claim 1, characterized in that the zone (B) in which the oxidizing charge is introduced is situated essentially half way along the two rollers.

3. Process according to claim 1, characterized in that the temperature of the two rollers is between 20° C. and 120° C.

4. Process according to claim 1, characterized in that the external surface of each roller is machined and has at least one hollow helical groove (5,6).

5. Process according to claim 4, characterized in that the external surface of each roller (21, 22) has a smooth end zone (31, 32).

6. Process according to claim 5, characterized in that the said rollers have an increased external diameter in the recovery zone, their external surfaces (31, 32) remaining separated.

7. Process according to claim 6, characterized in that the pyrotechnic product is withdrawn continuously in the form of a calendered strip.

8. Process according to claim 1, characterized in that the said inorganic oxidizing charge is selected from the group consisting of ammonium perchlorate, potassium perchlorate, ammonium nitrate and sodium nitrate.

9. Process according to claim 1, characterized in that the said organic oxidizing charge is selected from the group consisting of hexogen, octogen, oxynitrotriazole and nitroguanidine.

10. Process according to claim 1, characterized in that the said pre-formulated binder pellets contain a thermoplastic resin, the softening temperature of which is between 100° C. and 200° C.

11. Process according to claim 10, characterized in that the said resin is a homopolymeric resin selected from the group consisting of polyethylenes, polypropylenes, polybutylenes, polyisobutylenes, cellulose esters, vinyl polyacetates, vinyl polyalcohols and polyamides.

12. Process according to claim 10, characterized in that the said resin consists of a copolymer selected from the group consisting of polyvinyl polyacetates, polyvinyl polyalcohols, polyvinyl polybutyrals, styrene/butadiene/styrene block copolymers, styrene/isoprene/styrene block copolymers, styrene/ethylene-butylene/styrene block copolymers, polyether/polyamide block copolymers, block polyurethanes with polyether, polyester and polyacetal units and vinylidene polyfluoride.

13. Process according to one of claims 10 to 12, characterized in that the binder contains a plasticizer selected from the group consisting of dioctyl phthalate, dioctyl adipate, dioctyl azelate, butyl benzene sulfonamide and toluene sulfonamide, the weight of the said plasticizer being between 10 and 70% by weight of the said resin.

14. Process according to claim 13, characterized in that the softening temperature of the thermoplastic resin/plasticizer mixture is between 100° C. and 150° C.

15. Process according to claim 1, characterized in that the said pre-formulated binder pellets consist of quasi-thermoplastic compounds which are capable, on addition of external energy, of reacting between themselves to form a crosslinked polymer.

16. Process according to claim 15, characterized in that the said quasi-thermoplastic compounds are polymers bearing functional vinyl or acrylic groups.

17. Process according to claim 15, characterized in that the said quasi-thermoplastic compounds consist of a mixture of at least:

i) one polyol ii) one reactive polyisocyanate iii) one blocked polyisocyanate, the molar ratio of reactive NCO/OH groups being between 0.4 and 0.6 and the molar ratio of blocked NCO groups/OH groups being between 0.6 and 0.4.

18. Apparatus for putting the process according to claims 5, 6 or 7 into practice comprising:

i) a roll mill consisting of two cylindrical rollers (21 and 22) of identical length, the axes of which are situated in the same horizontal plane, turning in opposite directions to each other at different speeds, and having smooth end zones (31 and 32), with a larger diameter and arranged opposite each other, the external surfaces of these two zones remaining separated so as allow a slit (33) to exist between them, ii) a knife (34) pressing on the external surface of the end zone (31) of the faster turning roller (21), iii) a conveyer belt (35) arranged opposite the end zone (31) of the faster turning roller (21) and perpendicular to the axis of the latter.

19. Apparatus according to claim 18, characterized in that the external surfaces of the rollers (21 and 22) have hollow helical grooves (29 and 30) which do not extend to the end zones (31 and 32).

* * * * *